3,594,205
Patented July 20, 1971

1

3,594,205
HYDROUS OXIDE TREATED ALKALI TITANATES
Hugh C. Gulledge, Wilmington, and George Leotasacos Lewis, Newark, Del., assignors to E. I. du Pont de Nemours and Company, Wilmington, Del.
No Drawing. Continuation-in-part of application Ser. No. 411,692, Nov. 17, 1964, now Patent No. 3,380,847. This application Apr. 29, 1968, Ser. No. 725,149
Int. Cl. C09c 1/00, 1/36
U.S. Cl. 106—299     2 Claims

ABSTRACT OF THE DISCLOSURE

A fibrous alkali titanate in intimate association with from 0.1 to 25% by weight based on the weight of the fibrous titanate, of precipitated alumina, titania or zirconia has particular utility as a pigment in paper manufacture and as an insulating composition.

CROSS-REFERENCES

This application is a continuation-in-part of application Ser. No. 411,692, Nov. 17, 1964, now U.S. Pat. 3,380,847, dated Apr. 30, 1968.

BACKGROUND OF THE INVENTION

Fibrous asbestos-like water-insoluble alkali metal titanates are known in several forms as described in U.S. 2,833,620, 2,841,470, 3,129,105, 3,328,117 and 3,331,660, and U.S. application S.N. 705,291 filed Feb. 14 1968. They are insoluble, high-melting fine, fibrous or acicular particles and are useful as insulation particularly because of their high infrared reflectance and as white pigments especially in paper and flat paints; their particle size characteristics, largely determinative of their utility is controlled by methods of U.S. 3,328,117. Fibers of pigmentary size, i.e. having fiber widths of from 0.1 to 1 micron (preferably from 0.1 to 0.5 micron) show particularly good opacifying action in paper.

SUMMARY OF THE INVENTION

In accordance with the present invention a fibrous alkali titanate of the formula $(M_2O)_{1-x}(A_2O)_x(TiO_2)_n$ where M is an alkali atom, preferably Na or K, A is $H^+$ or $H_3O^+$, $x$ is no greater than 0.9 including zero and $n$ ranges from 4 to 9, and preferably 4 to 6, alternately the fibrous dehydrated product obtained by heating the water containing fibers, is slurried in water and hydrous oxides of Al, Ti and/or Zr are precipitated and distributed within the slurry. The resulting slurry may be concentrated by dewatering for use as a slurry or paste, or, it may be filtered, washed and dried. In some instances washing is not necessary.

The precipitation of the alumina may be accomplished by several means. In general a water soluble compound of aluminum is introduced into the slurry and the slurry is maintained during such addition, or subsequently adjusted to, the pH range which precipitates aluminum ions as the hydrous oxide, usually between 5 and 8 pH. Final adjustment to near neutrality is often desired. The following specific illustrative pairs or reagents, preferably in aqueous solution may be used either simultaneously or in sequence to precipitate alumina. They are either alkaline or acid in character.

Acid:              Alkaline
  Aluminum sulfate _____  Sodium hydroxide.
  Alum _____  Potassium hydroxide.
  Aluminum chloride _____  Ammonium hydroxide.
  Sulfuric acid _____  Sodium aluminate.
  Aluminum sulfate _____  Sodium aluminate.

Quite obviously any combination of an acidic reagent and a basic reagent may be used as long as at least one of them contains soluble aluminum. At least a portion of the alkaline agent may be derived from the alkali titanate itself.

Titania may be precipitated by similar reactions except that no alkaline solutions of titanium are readily available. Precipitation is accomplished by mixing with the slurry of titanate acidic solutions of titanium salts such as the acetate, chloride or sulfate and simultaneously or subsequently neutralizing the acid with a base such as sodium or potassium hydroxide, ammonium hydroxide and the like.

Zirconia is precipitated in the same manner as is titania using the corresponding compounds in solution.

Any one of the three hydrous oxides may be precipitated alone or in combination with one or more of the other hydrous oxides. They may be precipitated simultaneously or in any sequence. Co-precipitation, for example by adding solutions of titanium sulfate and sodium aluminate in the desired quantities, may be employed. If necessary, additional base or acid may be added with the agents to arrive at near neutrality.

The following examples are cited to illustrate the invention. They are not intended to limit it in any manner.

Example 1

A mix of 400 lbs. of $TiO_2$ (anatase pigment), 260 lbs. of anhydrous $K_2CO_3$ and 600 lbs. of fine granulated KCl is blended 60 hours in a conventional blade type blender and then pelletized to cylindrical pellets 1 inch diameter x ¾ inch high. The pellets are calcined at 950° C. in a rotary calciner with average hold time at temperature of approximately 3 hours and thereafter loaded in a cylindrical tank and washed by gravity flow with a softened water until a leached lump product in which the molar ratio of $TiO_2$ to $K_2O$ of approximately 5 is formed. The leached lumps are exfoliated by stirring into demineralized water and passage through an attrition mill set at 3 mils clearance at a final concentration of 3.5% solids. The pH is adjusted with 1.0 N $H_2SO_4$ to 9.3 and the pulp is filtered and dried. Chemical analysis of the dried pulp (analytical sample dried 3 hours at 600° C.): $K_2SO_4$, .1%; $TiO_2$, 84.0%; $K_2O$, 15.04%; $TiO_2/K_2O$, 6.6%.

745 grams of the dry pulp is dispersed in 20 liters of distilled water with a propeller stirrer and 32 cc. of a 200 g./l. $Al_2(SO_4)_3 \cdot H_2O$ solution is then added to provide a pH of 9.6. Thereafter, addition of the alum solution is continued simultaneously with addition of a 100 g./l. KOH solution to maintain the pH of the dispersion at 9.6. A total of 1042 cc. alum solution (4% $Al_2O_3$ on product) and 1145 cc. KOH solution is added over a 15 minute period. The resulting dispersion is stirred for 5 minutes and then filtered on a 120-mesh screen in a 12" x 12" box with vacuum. Thereafter, the wet cake is dispersed in 18,000 cc. distilled water with propeller stirrer over a 10 minute period, the pH of the final dispersion being 9.4. A block is formed by vacuum filtration on a 120-mesh screen and dried at 130° C. The finished block material exhibits resistance to shrinkage on heating and good flexural strength as shown in the table below. In the table the percent shrinkage of the block structure both with and without $Al_2O_3$ is reported. The shrink test is conducted by total immersion for 20 hours of each product in a furnace heated to a temperature of 2,100° F.±10° F., with shrinkage being calculated by making measurements on each block tested, before and after immersion. Shrinkage is reported as observed upon both the block thickness and a composite average of length, width and thickness as indicated.

Example 2

206 grams of the wet leached lumps prepared as in Example 1 are crushed through a 6-mesh screen and dispersed in 2.5 liter of distilled water by one pass through a colloid mill. The dispersion is allowed to settle for 5 minutes, decanted to remove unexfoliated material and then 10 cc. of a 100 g./l. KOH solution is added to provide a pH of 11.5. Thereafter, 13.5 cc. of a $TiCl_4$ solution (100 g./l. $TiO_2$) is added, producing a pH of 8.2 and further addition of $TiCl_4$ is accompanied by simultaneous addition of a 100 g./l. KOH solution to hold the pH at 8.2. A total of 45 cc. (5.07% $TiO_2$ on product) $TiCl_4$ solution and 59 cc. of KOH solution is added over a period of 15 minutes. The material is filtered on a Buchner funnel, washed with 1000 cc. distilled water, and then redispersed in 2000 cc. distilled water with a propeller stirrer. A finished block, pulled on the Buchner funnel, is dried at 130° C. The table below reports the heat shrinkage properties when tested at 2040° F. for 20 hours of the product in comparison with those of the untreated material.

Example 3

20 cc. of 100 g./l. KOH solution is added to an exfoliated dispersion prepared as described in Example 2 to provide a pH of 12.02. 105 cc. of a $ZrCl_4$ solution (53 g./l. $ZrO_2$) is then added over a 15 minute period to give a pH of 8.2. This addition is equivalent to 6.3% $ZrO_2$ on product. The material is then filtered on a Buchner funnel, washed with 1000 cc. distilled water, dispersed in 2000 cc. distilled water with a propeller stirrer and pulled down on a Buchner funnel to form a block which is dried at 130° C. The heat shrinkage characteristics of this block upon exposure to 2040° F. for 20 hours compared to one of the untreated material is reported in the table below.

TABLE

| Ex. | $Al_2O_3$ | $TiO_2$ | $ZrO_2$ | Block density, lb./cu. ft. | Flexural break, p.s.i. | Shrinkage, percent Thick. | Avg. L.W.T.* |
|---|---|---|---|---|---|---|---|
| 1 | 0 | 0 | 0 | 21.2 | 34.6 | 27.2 | 14.9 |
| 1 | 4.0 | | | 23.2 | 69.8 | 13.8 | 3.9 |
| 2 | | 5.07 | | 18.7 | 42.0 | 14.9 | 6.9 |
| 3 | | | 6.3 | 18.4 | 20.0 | 4.4 | 1.3 |
| 2 and 3 | 0 | 0 | 0 | 19.0 | 18.0 | 33.9 | 11.8 |

*=Length, width, thickness.

Example 4

Potassium titanate pigment prepared by mixing 9.2 parts by weight of KOH, 20 parts of $TiO_2$, 9 parts of KCl and enough water to form a paste, drying the paste, crushing it to granular form and calcining at 975° C. for 70 minutes is leached in water to remove KCl and excess KOH. The leached product is suspended in deionized water at 10% concentration and passed three times through a colloid mill to exfoliate the fibers. The dispersed fraction is separated from the grit by sedimentation. The fine fraction, still in water suspension is adjusted to pH 4.5 with sulfuric acid to leach out more of the alkali producing an acid potassium titanate with a $TiO_2/K_2O$ mol ratio of about 10. To this slurry is added aluminum sulfate solution equivalent to 5% $Al_2O_3$ based on the fiber weight. With agitation the pH of the slurry is adjusted to about 7 with ammonia. After filtering, washing and drying at 110–120° C. the dried fibers are dry milled and found to have better dispersibility in an emulsion paint formulation than similar fibers untreated with alumina. When used in pigmenting paper, it is found that the alum demand is decreased by the alumina treatment of the fibers.

Example 5

Potassium tetratitanate fibers having the composition $K_2O(TiO_2)_4$ obtained by calcination of KOH, KCl and $TiO_2$ are washed and suspended in distilled water. Due to the available alkali the slurry pH is about 11. To a portion of the slurry, containing 100 grams of fibers, are added 4 grams of $Al_2SO_4 \cdot 18H_2O$, equivalent to 0.61 gm. $Al_2O_3$. After agitation the slurry is still slightly alkaline indicating that enough KOH is available to precipitate the alumina. Upon filtration, the filter cake when dried at 130° C. shows greater density than a similar cake not treated with alumina. This is an indication that the product has greater mechanical strength when used as insulation.

The products of the present invention are useful as pigments particularly valuable in opacifying paper and also as insulating fibers which are highly resistant to shrinkage upon exposure to heat. When used as insulating fibers, various binders such as carboxymethyl cellulose and polyvinyl alcohol, may be employed to increase structural strength of the insulating structure and other inorganic materials having at least one minor dimension such as fibers of mineral wool or platy materials such as mica may be added up to 20% by weight or more.

Many equivalent modifications of the present invention will become apparent to those skilled in the art from a reading of the above without a departure from the inventive concept.

What is claimed is:

1. A composition of matter comprising (1) a fibrous alkali titanate from the class consisting of (a) titanates of the formula $(M_2O)_{1-x}(A_2O)_x(TiO_2)_n$ wherein M is a sodium or potassium ion, A is a hydrogen or hydronium ion, x is not greater than 0.9 and includes zero, and n is a value from 4 to 9 inclusive, and (b) the dehydrated products of (a) and (2) intimately associated therewith, from 0.1 to 25% by weight based on the weight of the said fibrous titanate of precipitated alumina.

2. A pigmentary composition of the composition of claim 1 wherein the said fibrous alkali titanate particles have an average width less than one micron.

References Cited

UNITED STATES PATENTS

| 3,258,392 | 6/1966 | Brill et al. | 106—299X |
| 3,328,117 | 6/1967 | Emslie et al. | 106—299X |
| 3,484,260 | 12/1969 | Emslie et al. | 106—300 |

TOBIAS E. LEVOW, Primary Examiner

H. M. S. SNEED, Assistant Examiner

U.S. Cl. X.R.

106—300; 252—62